United States Patent Office 2,830,023
Patented Apr. 8, 1958

2,830,023

COMPLEX ESTER-PHOSPHORUS SULFIDE REACTION PRODUCTS AND LUBRICANTS CONTAINING THEM

Michael F. Hoare, Abingdon, England, assignor to Esso Research and Engineering Company, a corporation of Delaware No Drawing. Application August 12, 1953
Serial No. 373,909

Claims priority, application Great Britain
September 3, 1952

12 Claims. (Cl. 252—46.6)

This invention relates to a new phosphorus and sulphur containing organic compound and to new and improved lubricating compositions containing this compound. It particularly relates to a phosphorus and sulphur containing compound that may be added to oxygen containing synthetic lubricants to improve their lubricity and resistance to oxidation.

The phosphorus and sulphur containing organic compounds of the present invention are obtained by the treatment of complex esters, as hereinafter defined, with a phosphorus sulphide or with a mixture of phosphorus and sulphur.

Complex esters are here meant to include esters containing more than three acid, alcohol, polybasic acid or polyhydric alcohol residues and in which there is at least one polyhydric alcohol and one polybasic acid residue, each of which has at least two of its functional groups esterified. They may be formed by the esterification, in one or more stages, of mixtures of multifunctional acids and multifunctional alcohols with or without monofunctional acids, monofunctional acids and alcohols or monofunctional alcohols. They may also be formed from compounds containing both hydroxy and carboxy groups or containing both alcohol and/or acid reacting groups. In fact the complex ester class includes all those compounds in the molecule of which at least two residues with a plurality of esterifiable groups has at least two of such groups esterified. Where present the monofunctional components normally provide the terminal groups and their proportion in the esterification mixture determines the average number of multifuctional acid and alcohol groups that will be present in the final ester molecule. In many cases the theoretical molecular structure of the complex ester molecule may represent an average only, individual molecules differing widely in chain length and configuration.

Some complex esters of this type have been suggested as lubricants, see British Patent No. 666,697, and British patent applications Nos. 24,925/48, 31,034/48, 31,036/48, 33,406/48 and 2,821/50.

For example, in British Patent No. 666,697 there is described a complex ester of the general formula:

R′OOC—R″—COO—R—OOC—R″—COOR′ prepared by reacting together under esterification conditions and in one or more stages two molar proportions of a dicarboxylic acid

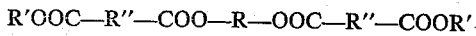

two molar proportions of an aliphatic monohydric alcohol (R′OH), and one molar proportion of a polyglycol

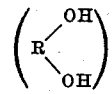

wherein the acid is sebacic and/or adipic acid, the alcohol is a branched chain $C_8$ or $C_9$ saturated monohydric aliphatic alcohol or a mixture in which such alcohols predominate, and the polyglycol is a polyethylene glycol up to and including hexaethylene glycol or a polyethylene glycol fraction whose average molecular weight does not substantially exceed that of hexaethylene glycol.

Complex esters have, on the whole, excellent lubricating properties. However, they are frequently too thick, particularly at low temperatures, to be used alone as lubricants. Their lubricating is associated with high oiliness rather than with E. P. (extreme pressure) properties.

Where the complex esters are to be used as E. P. lubricants or where they are diluted with thinner lubricants with resultant loss of lubricity, it is desirable to add some agent that will improve their lubrication without seriously affecting their other properties. It is with such an agent that this invention is concerned.

It has been discovered that complex esters can be reacted with phosphorus sulphides or mixtures of phosphorus and sulphur, to give products that are soluble in oxygen containing lubricants and which improve the lubricating properties thereof.

Thus this invention comprises chemical compounds adapted to improving the lubricity of oxygen containing lubricants obtained by reacting a complex ester with a phosphorus sulphide, a mixture of phosphorus sulphides or with an elemental mixture of phosphorus and sulphur.

Any phosphorus sulphide can be used for the manufacture of the products of this invention. The preferred sulphides are, however, $P_2S_5$ and $P_4S_3$. The elements phosphorus and sulphur can be used either simultaneously or in turn. Thus, the complex ester can first be reacted with sulphur followed by reaction with phosphorus. The sulphurisation reacton is accelerated and to some extent modified by the use of a catalyst which may be a rubber vulcanisation accelerator.

The temperature at which the phosphosulphurisation is performed has a considerable effect on the nature of the product. At room temperature the reaction is slight. In the preferred method of treatment phosphorus pentasulphide is used and is heated up with the complex ester. The reaction under these conditions appears to take place in two stages. The first at about 204 to 250° F. gives a product that smells strongly of $P_2S_5$ and the second at 370 to 390° F. gives a dark red reaction product. Treatment at liquid temperatures above 390° F. leads to rapid formation of sludge and tarry matter. The reaction is normally highly exothermic so that heating must be applied continuously to avoid the undesirable temperature zone above about 390° F. These temperature ranges were obtained when reacting phosphorus pentasulphide with the complex ester obtained from 2 moles of 3,5,5,trimethyl hexanol, 2 moles of sebacic acid and 1 mole of polyglycol 200 (crude tetraethylene glycol). Clearly the temperature ranges will vary somewhat with different reactants but they may readily be determined by experiment. The compounds that are particularly useful are those that are produced during the second stage of the above reaction.

Under the conditions of reaction described above the product is suitable for use as an E. P. agent for many

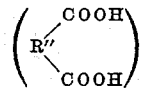

purposes. If desired, however, the product may be purified. This purification may be obligatory in order to form a satisfactory product when the reaction has been performed under different conditions. Purification can take the form of filtration, adsorbent treatment, steam or vacuum stripping or solvent extraction. Adsorbent treatment is particularly desirable where the product has an acidity that makes it unsuitable for use. A suitable adsorbent is clay or other activated earth, activated carbon or silica gel and particularly striking results have been obtained using alumina fines.

The proportion of phosphorus sulphide used may be varied between quite wide limits. The amount that will react depends on the complex ester used and the reaction conditions. Thus an unsaturated complex ester will, generally speaking, take up more phosphorus and sulphur than a saturated one. If more phosphorus sulphide is used than reacts with the complex ester then unreacted material can be separated from the product, e. g. by filtration and, if desired, recycled. If less phosphorus sulphide is used than will react under the conditions of the reaction, then a product of relatively low phosphorus and sulphur content will be formed which will be less potent as an E. P. additive but which will, nevertheless, have applications where milder conditions are experienced.

The preferred range of phosphorus sulphide, preferably phosphorus pentasulphide treatment is below 20% by weight. The particularly preferred range is between 5 and 15% by weight of the complex ester.

The preparation of a typical product of the present invention will now be described. This product is obtained by the reaction of phosphorus pentasulphide, $P_2S_5$ with the complex ester A formed by the reaction under esterification conditions of 2 moles of 3,5,5, trimethyl hexanol, 2 moles of sebacic acid and 1 mole of Polyglycol 200. The following table gives the observation on such a preparation using 6.0% phosphorus pentasulphide by weight of the complex ester.

| Time, minutes | Liq. Temp., °F. | Observation |
|---|---|---|
| 0 | Room temperature | 1,500 gms. complex ester, 90 gms. $P_2S_5$. |
| 10 | 130 | $H_2S$ evolved. |
| 20 | 204 | Do. |
| 35 | 250 | No $H_2S$. |
| 50 | 280 | Do. |
| 65 | 330 | Liquid darkens, $H_2S$ evolved. |
| 80 | 368 | Heating stopped, $H_2S$ evolved. |
| 95 | 380 | $H_2S$ evolved. |
| 110 | 385 | Do. |
| 170 | 387 | Do. |
| 190 | 385 | Preparation stopped. |

The product of this reaction was decanted and filtered leaving a dark residue which was presumed to comprise unreacted $P_2S_5$ and decomposition products of the reaction.

The product was tested in the Falex and S. A. E machines to determine its potency as an E. P. additive. The following results were obtained:

*Falex machine results*

| Oil | Failure load, lbs. | Remarks |
|---|---|---|
| Light lubricating Oil A | 1,000 | Heavy wear. |
| Complex Ester A | 2,000 | Slight wear. |
| Oil A plus 1% complex ester A | 1,250 | Fairly heavy wear. |
| Oil A plus 1% $P_2S_5$ treated ester A | 2,000 | Light wear. |
| Oil A plus 1% tributyl phosphate | 1,400 | Very light wear. |
| Ester blend B [1] | 1,900 | Moderate wear. |
| Ester blend B plus 3.5% $P_2S_5$ treated ester A. | 4,500 plus | Light wear, could not be failed by machine. |
| Dioctyl adipate | 1,400 | |
| Dioctyl adipate plus 3% tributyl phosphate. | 2,700 | Very light wear. |
| Dioctyl adipate plus 3.3% $P_2S_5$ treated ester A. | 4,400 | |

[1] Blend of 60% complex ester from sebacic acid, Polyglycol 200 and 2 ethyl hexanol plus 40% dinonyl sebacate.

*S. A. E. machine results*

| | Failure load |
|---|---|
| Steam turbine oil | 120 |
| Steam turbine oil plus 2% tributyl phosphate plus 1.2% isopropyl oleate | 135 |
| Steam turbine oil plus 1% $P_2S_5$ treated ester A | 157 |
| Dioctyl adipate | 81 |
| Dioctyl adipate plus 1% $P_2S_5$ treated ester A | 108 |
| Dioctyl adipate plus 2% $P_2S_5$ treated ester A | 145 |
| Dioctyl adipate plus 5% $P_2S_5$ treated ester A | 470 |

It will be seen that the effect of the product of this invention is strikingly apparent under both conditions of test. In this connection it is interesting to compare this product with a prior art additive such as tributyl phosphate or with a combination of tributyl phosphate and an oiliness agent such as isopropyl oleate.

The product of this invention has further advantages. Unlike many prior art phosphorus and sulphur containing materials it has little corrosive effect on even so susceptible a material as copper. A further advantage is that it has a powerful anti-oxidant action. Both these properties are manifest in the following table.

| | Copper strip corrosion | Sunbury Beeker Corrosion, wt. loss, mg./hr. | |
|---|---|---|---|
| | | Test piece: Cadmium plated steel. Catalyst: Copper. | Copper Mild steel |
| Ester Blend C [1] plus 3% $P_2S_5$ treated Ester A | 2 | Nil | |
| Ester Blend C [1] plus 5% $P_2S_5$ treated Ester A | 3 | | |
| Ester Blend B plus 1% Penothiazine | 4 | −0.11 | −0.17 |
| Ester Blend B plus 0.4% Antioxidant D | 4 | −0.14 | −1.0 |
| Ester Blend B plus 3% $P_2S_5$ treated Ester A | | Nil | −0.7 |

[1] Ester blend C comprised 20% of the complex ester formed from 2 moles 2 ethyl-hexanol, 2 moles of sebacic acid and 1 mole Polyglycol 200 with 80% of dioctyl adipate.

It will be seen in this table that all the copper strip corrosion test ratings are satisfactory and that the antioxidant action of the product of this invention is pronounced. In this latter connection it is interesting to compare the efficacy of the known antioxidants phenothiazine and antioxidant D (phosphosulphurised alpha-pinene) with that of the present product.

The products of the present invention exert their effect in all lubricants in which they are soluble. In the case of mineral lubricating oils the upper limit of solubility is only a few percent and so the use is restricted. However, in synthetic lubricants and natural oils the oxygenated atoms appear to increase the solvency of this type of product and enable much higher proportions to be used.

Generally the amount of this product that should be used in a lubricating oil depends on the degree of E. P. properties and/or antioxidant properties required. Apart from the limitation of solubility mentioned above it is normally desirable to use less than 20% by weight of the additive, the preferred range being 0.1–15%. The particularly preferred compositions of the present invention comprise oxygenated lubricating oils containing 0.5–5% by weight of the compounds of this invention. Examples of oxygenated lubricating oils that form suitable vehicles for these additives are ester lubricants—including complex esters, diesters and simple esters, and the ether oils such as polyethylene glycol mono- or di-alkyl ethers.

The compositions of the present invention may, of course, contain any of a wide range of conventional additive materials in addition to the products of this invention. Thus dyes, antioxidants, detergents, corrosion inhibitors, oiliness agents and E. P. agents may be used.

Synthetic ester lubricants that may be used in conjunction with the products of this invention include those covered in the applications mentioned earlier in this application, viz., British Patent No. 666,697, and British patent applications Nos. 24,925/48, 31,034/48, 31,036/48, 33,406/48 and 2,821/50. These applications cover complex esters that may be used alone or in blends with other oleaginous liquids as described in British patent applications Nos. 7,472/49, 7,473/49, 7,983/49, 1,630/51, 5,098/51, 20,959/50, 11,663/52 and 11,664/52.

What is claimed is:

1. A method of preparing a phospho-sulfurized product which comprises reacting a phospho-sulfurizing agent selected from the group consisting of phosphorus sulfides and a combination of the elements sulfur and phosphorus with a lubricating grade complex ester at an elevated temperature, said complex ester being derived from esterification reactions between about 2 molar portions of a dicarboxylic acid selected from the group consisting of sebacic and adipic acid, about 2 molar portions of a $C_8$ to $C_9$ branched chain saturated monohydric aliphatic alcohol and about 1 molar portion of a polyethylene glycol up to hexaethylene glycol, and purifying said reaction product.

2. A method according to claim 1 in which said purification comprises filtering said reaction product.

3. As a new composition of matter a product obtained by reacting a phospho-sulfurizing agent selected from the group consisting of phosphorus sulfides and a combination of the elements sulfur and phosphorus with a lubricating grade complex ester at an elevated temperature, said ester being derived from esterification reactions between about 2 moles of a dicarboxylic acid selected from the group consisting of sebacic and adipic acid, about 2 moles of an aliphatic branched chain saturated $C_8$ to $C_9$ monohydric alcohol and about 1 mole of a polyethylene glycol up to hexaethylene glycol.

4. A composition according to claim 3 in which said phosphorus sulfide is phosphorus pentasulfide.

5. A composition according to claim 3 in which said elevated temperature is within the range of about 370 to 390° F.

6. As a new composition of matter a product obtained by reacting a phosphorus sulfide with a lubricating grade complex ester at a temperature within the range of about 370° to 390° F., said complex being derived from esterification reactions between about 2 moles of 3,5,5-trimethyl hexanol, about 2 moles of sebacic acid and about 1 mole of tetraethylene glycol.

7. A lubricating oil composition containing dissolved therein a minor proportion of the phospho-sulfurized product of claim 3 sufficient to increase the extreme pressure characteristic and oxidation resistance of said lubricating oil.

8. A composition according to claim 6 in which said phosphorus sulfide is phosphorus pentasulfide.

9. A lubricating oil composition according to claim 7 in which said lubricating oil is selected from the group consisting of a mineral lubricating oil and an oxygen containing synthetic lubricating oil.

10. A lubricating oil composition according to claim 9 in which said lubricating oil is a synthetic ester lubricating oil.

11. A lubricating oil composition containing dissolved therein about 0.5 to 5.0% by weight of a product obtained by reacting a phosphorus sulfide with a lubricating grade complex ester at a temperature within the range of about 370 to 390° F., said complex ester being derived from esterification reactions between about 2 moles of 3,5,5-trimethyl hexanol, about 2 moles of sebacic acid and about 1 mole of tetraethylene glycol.

12. A lubricating oil composition according to claim 11 in which said lubricating oil is a synthetic ester lubricating oil and said phosphorus sulfide is phosphorus pentasulfide.

References Cited in the file of this patent

UNITED STATES PATENTS

| | | |
|---|---|---|
| 2,566,241 | Musselman | Aug. 28, 1951 |
| 2,631,130 | Bartlett | Mar. 10, 1953 |
| 2,733,235 | Cross | Jan. 31, 1956 |